United States Patent Office 3,488,272
Patented Jan. 6, 1970

3,488,272
ELECTROLYTIC DEPOSITION OF URETHANE FILMS ONTO METAL OR OTHER CONDUCTIVE SURFACES
Kurt C. Frisch, Grosse Ile, and Sidney L. Reegen, Oak Park, Mich., assignors to Wyandotte Chemicals Corporation, Wyandotte, Mich., a corporation of Michigan
No Drawing. Filed Dec. 27, 1966, Ser. No. 604,575
Int. Cl. C23b *13/00;* B01k *5/02*
U.S. Cl. 204—181
6 Claims

ABSTRACT OF THE DISCLOSURE

A method of coating metals with a polyurethane coating by immersing a metal to be coated as an anode of an electrical circuit in an aqueous polyurethane dispersion and passing an electric current between the anode and a cathode which is also immersed in the dispersion.

---

In order to protect metals from corrosion, it has been suggested to coat the surfaces with compositions which include various vehicles, such as phenolic resins, alkyd resins, drying oils and similar media. However, these compositions have not proven satisfactory in actual service for many applications. In accordance with U.S. Patent 2,910,381, a system is employed for coating metals, such as iron, steel, aluminum, magnesium, etc., which comprises the provision of a coating system for metals in which a facing layer of a highly moisture resistant and chemically resistant polyurethane resin is bonded to a surface preparation layer of a polyvinylacetal type resin. In some instances, bonding between the facing layer and the surface preparation layer may be direct. However, for maximum resistance to corrosion, etc., the polyurethane resin film is bonded to the surface preparation layer by means of an intermediate layer which preferably is a solution in a suitable solvent of a resin which is an interpolymer of a vinyl halide and a vinyl ester.

In the interest of economy of materials, time, labor, and equiment, it is highly desirable to be able to bond chemically resistant polyurethane resins directly to a metal surface without the use of the surface preparation layer required by the above process.

Accordingly, it is a purpose of this invention to provide a novel method of coating metals, such as iron, steel, aluminum, magnesium, etc., with a polyurethane coating wherein an adherent coating is produced which coats into cracks and crevices of the metal surface even where the coating is thin, i.e, where the necessity of obtaining thick coatings is not necessary to assure complete coverage.

This and other purposes of the instant invention are accomplished by immersing a metal to be coated as an anode of an electrical circuit in an aqueous polyurethane dispersion, and passing an electric current between the anode and a cathode which is also immersed in said dispersion. In a preferred embodiment of this invention, the voltage employed ranges from 5 to 250 volts direct current. A suitable coating may be produced in a very short time, i.e., ½ minute or less. The maximum amount of time depends only on the desired coating thickness, the amount of thickness increase gradually decreasing with increasing time. The coating process is generally carried out at ambient temperature and pressure although higher or lower temperatures and pressures may be employed.

Polyurethane compositions are regarded as the reaction product of a polyisocyanate and an active hydrogen containing organic compound, such as a hydroxy-terminated polyester, polyesteramide, or polyether. The preparation of polyurethanes is disclosed in many references, including the texts entitled Polyurethanes by Bernard A. Dombrow, published by Reinhold Publishing Corporation, New York, N.Y., 1957, and Polyurethanes: Chemistry and Technology by J. H. Saunders and K. C. Frisch, published by Interscience Publishers, New York-London, wherein disclosures are made of methods for producing polyurethanes. The parparation of aqueous dispersions or latices of polyurethane polymers is known in the prior art and is taught, for example, in U.S. Patent 2,968,575.

Aqueous dispersions or latices of polyurethane polymers may be prepared by reacting together (I) an isocyanate terminated polyurethane polymer formed from (a) active hydrogen containing organic compounds and mixtures thereof, and (b) an organic polyisocyanate; and (II) a chain extender containing active hydrogen. In one method the polymer (I) is emulsified or dispersed in water with vigorous agitation, followed by addition of the chain extender (II) with rapid agitation. Alternatively, the dispersion may be prepared by adding the prepolymer (I) to an aqueous solution of the chain extender (II) and the mixture agitated vigorously to form a stable dispersion or latex.

The isocyanate terminated polyurethane polymer (I), also referred to as a "prepolymer," employed as a starting material may be any such type compound which may be obtained by the reaction of a selected active hydrogen containing compound (a) having an average molecular weight of at least about 300 with a stoichiometric excess of an organic polyisocyanate (b). Such prepolymers are capable of molecular weight increase through chain extension with chain extension agents.

In general, any organic compound containing at least 2 active hydrogen atoms may be reacted with a stoichiometric excess of an organic polyisocyanate to get a prepolymer or an initial addition product which is then capable of a molecular weight increase through chain extension with a chain extender. Active hydrogen containing compounds of this sort include the polyalkylene ether glycols, the poly(alkylene ether-alkylene thioether) glycols, polyalkylene esters of alkylene diacids, polyalkylene esters of arylene diacids, esters of polyhydric alcohols and hydroxy fatty acids, alkyd resins containing hydroxyl or carboxyl end groups and polyester amide resins. The term "active hydrogen atoms" refers to hydrogens which, because of their position in the molecule, display activity according to the Zerewitinoff test as described by Kohler in J. Am. Chem. Soc., 49, 3181 (1927). Linear compounds containing hydrocarbon groups linked together by ether or ester linkages and having terminal hydroxyl groups are preferred representatives of this type of compound. A particularly useful class of active hydrogen containing compounds for this purpose is the polyalkylene ether glycols which have the general formula $H(OR)_nOH$ where R is an alkylene radical and $n$ is an integer which in a preferred embodiment is sufficiently large that the compound as a whole has a molecular weight of at least about 300. Molecular weights of up to 10,000 are satisfactory. Polyethylene ether glycols, poly-1,2-propylene ether glycol, polytetramethylene ether glycol, poly-1,2-dimethylene ether glycol, and polydecamethylene ether glycols are typical members of this class. Not all of the alkylene radicals present need to be the same. Glycols containing a mixture of radicals as in the compound $HO(CH_2OC_2H_4O)_nH$, or $$HO(C_2H_4O)_n(C_3H_6O)_m(C_2H_4O)_nH$$ 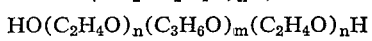

wherein $n$ and $m$ are together sufficient for attainment of the desired molecular weight can be used. Polyethylene ether-polypropylene ether glycols, having the above-indicated formula, are among the preferred glycols.

Any of a wide variety of organic polyisocyanates (b) may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate usually in proportions of 80% of the 2,4 isomer and 20% of the 2,6 isomer and referred to herein as mixed isomers of tolylene diisocyanate (80/20:2,4/2,6).

Additional polyisocyanates which may be employed, for example, include: p,p'-diphenylmethane diisocyanate, 3,3' - dimethyl - 4,4' - biphenylene diisocyanate, 3,3'-dimethoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanates, and other polyisocyanates in a blocked or semi-inactive form such as the bis-phenyl-carbamates of tolylene diisocyanate, p,p'-diphenylmethane diisocyanate, p-phenylene diisocyanate, and 1,5-naphthalene and 1,5-tetrahydronaphthalene diisocyanate.

In the preparation of the starting polyurethane polymer (I), an excess of the organic polyisocyanate (b) over the active hydrogen containing compound (a) is used. The ratio of organic polyisocyanate compound (b) to active hydrogen containing compound (a) is preferably such that the NCO/OH ratio is greater than about 1.3:1. While there is no upper limit to the NCO/OH ratio for practical purposes a ratio greater than about 2.75:1 is seldom employed.

The reaction may be effected in the absence of a solvent when the prepolymer (I) is a fluid at processing temperatures. When it is not, or when it is desired to employ a solvent, convenient solvents are inert organic solvents having a boiling range above about 100° C. when the reaction is to be carried out in open equipment.

The solvents to be used are preferably those in which the reactants have some solubility but in which the final chain-extended elastomer is insoluble. Ketones, tertiary alcohols and esters may be used.

Toluene and isopropyl acetate are preferred solvents. The amount of solvent used may be varied widely. Any amount of solvent up to about 100 parts of solvent per 100 parts of prepolymer has been found to be operable. The excess solvent, where large amounts are employed, may be separated partially or completely from the polymer prior to emulsification in the water solution. Sometimes the excess solvent is useful and is allowed to remain during the emulsification stage.

The active hydrogen containing compound and the isocyanate are ordinarily reacted by heating with agitation at a temperature of about 50° to 130° C. without a catalyst or at about 25° to 60° C. where a catalyst such as stannous octoate is employed. The reactants are heated for a period sufficient to react most, if not all, of the hydroxy groups, whereafter the prepolymer is allowed to stand and the free NCO content determined. A period of from about 1 to 3 hours is preferred when a catalyst is not employed whereas a period of from about 10 minutes to 3 hours is preferred when a catalyst is employed.

Usual pH's are employed during preparation of the prepolymer, the reaction preferably being maintained substantially neutral. Bases accelerate the reaction, acids retard the reaction, and preferably neither are added.

The chain extending agent which is used is a compound containing a plurality of active hydrogen atoms capable of reacting with isocyanates. In the chain extenders useful in this invention, the active hydrogen atoms are preferably attached to oxygen, nitrogen or sulfur. The groups containing the active hydrogen will ordinarily have —OH, —SH, —NH—, —NH$_2$, —COOH, —CONH$_2$, —CONHR where R represents an organic radical, —SO$_2$OH, —SO$_2$NH$_2$, or —CSNH$_2$. The chain extending compound may be aliphatic, aromatic or cycloaliphatic or of mixed type. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylenediamine, succinic acid, succinamide, 1,4-butanedisulfonamide, 2,4-tolylenediamine, bis(4-aminophenyl)methane, beta-hydroxypropionic acid and 1,2-ethanedisulfonic acid. Compounds containing at least one amino group are preferred organic chain extending agents.

Certain of the chain extending agents are considerably more reactive with isocyanates than others and the speed of reaction may be, to some extent, controlled by a suitable choice of extending agent. The amines are particularly reactive agents. Particularly desirable for this purpose are diamines. Suitable diamines for carrying out the present process are aliphatic, cycloaliphatic, aromatic, araliphatic and heterocyclic diamines. The amount of chain extender (II) should be sufficient to react with all the free isocyanate groups in polymer (I). For practical purposes the chain extender (II) is preferably employed in amounts to provide an active hydrogen/NCO ratio of from about 0.75:1 to 1.9:1.

The amount of water to be employed in the formation of the dispersion is not critical, although, in general, it is preferred to employ a proportion by weight of polymer (I) to water of from about 1:4 to 2:1. When too small an amount of water is employed, emulsions are obtained which are too thick to handle readily; while, on the other hand, dispersions which are too dilute are uneconomical to handle due to their excessive volume.

An emulsifying agent is often desirable although it is not always necessary. Any emulsifying agent or surface active agent which will give oil-in-water emulsions is satisfactory for use in the present invention. Satisfactory types of emulsifying agents are the polyethylene glycol ethers of long chain alcohols; quaternary ammonium salts; the tertiary amine or alkylol amine salts of long chain alkyl acid sulfate esters, alkyl sulfonic acids or alkyl aryl sulfonic acids; and alkali metal salts of high molecular weight organic acids. One method of incorporating such salts is to mix the acid, e.g., tall oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From about 2% to 6% of the emulsifying agent based on the weight of the prepolymer employed will usually be found sufficient to produce stable emulsions.

In one embodiment of this invention, the chain extender (II) is dissolved in water first, with or without an emulsifying agent, and agitated as needed. This mixture is then added to the dispersion of the prepolymer (I) in water. The amount of water to be employed is not critical. The over-all mixture is then dispersed with agitation.

In lieu of the prepolymer method described above, a so-called "one-shot" method may be employed wherein the active hydrogen containing organic compound (1), organic isocyanate (2), chain extender (3) which for preparing a polyurethane-urea is a chemically hindered, aromatic diamine and a metallo-organic salt catalyst (4) are simultaneously dispersed in water with vigorous agitation.

The term "polyurethane" as used herein includes polyurethane-urea compounds. The weight ratio of the total weight of compounds (1), (2), (3) and (4) to water is preferably from about 1:6 to 2:1.

The active hydrogen containing compounds (1) and organic isocyanates (2) which can be employed in preparing urethanes by a direct, one-step method are the same as set forth above for preparing by the prepolymer method. The organic diisocyanate is used in an amount which provides an NCO/(OH+NH$_2$) ratio from about 0.90:1 to 1.6:1.

The chain extender (3) employed in the "one-step"

method may be the same as for the prepolymer method except in the preparation of a polyurethane-urea wherein "chemically hindered, aromatic diamines" are required.

The term "chemically hindered, aromatic diamine" as used herein refers to an aromatic diamine which has one or more negative substituents on the aromatic ring to which the amine group is attached. Examples of such negative substituents are the halogen and nitro-groups.

The chemically hindered, aromatic diamines which can be employed in preparing the polyurethane-urea compounds by the one-step method include, for example, 4,4'-methylene-bis-(2 - fluoroaniline), 4,4' - methylene-bis-(2-chloroaniline), 4,4'-methylene-bis-(2-bromoaniline), 4,4'-methylene-bis-(2-nitroaniline), and 4,4'-diamino-3,3'-dichlorodiphenyl. The diamine is used in an amount such that the $NH_2$/OH ratio is from about 0.5:1 to 6:1. Since the diamines are crystalline materials, it is desirable to dissolve the amine in the polyoxyalkylene polyol prior to interacting the reactants.

The metallo-organic salt catalyst which is employed is a polyvalent metal salt of an aliphatic acid having up to about 18 carbon atoms and being void of active hydrogen atoms. The organo portion of the salt may be either linear or cyclic and saturated or unsaturated. The polyvalent metal has a valence from about 2 to 4. Although trivalent and tetravalent metal salts of aliphatic acids are effective catalysts in the method of the invention, bivalent metal salts of aliphatic acids are preferred as catalysts. Typical metallo-organic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, cobalt naphthenate, zinc naphthenate, cadmium naphethenate, dibutyltin dilaurate, dibutyltin-di-2-ethylhexoate, stannic octoate, stannic oleate and the like. The metallo-organic salt catalyst is used in an amount by weight corresponding to about 0.01 to 1.0% based upon the combined weight of polyether polyol and diamine. Tertiary amines such as triethylenediamine and 1,2,4-trimethylpiperazine are advantageously used in conjunction with the metallo-organic salts as catalysts for the one-step method described herein.

In addition to the principal components, other additives or ingredients which may be used in the formulation in order to impart special properties to the elastomers include fillers, extenders, pigments and dyes.

In the "one-shot" process the polyol, chain extender and diisocyanate are interacted in the presence of the metallo-organic catalyst in the proportions set forth in general at a temperature from about 0° to 120° C., preferably at a temperature from about 15° to 40° C.

The following examples are given to illustrate the invention:

EXAMPLE I

A prepolymer dispersion is prepared by vigorously agitating a mixture of 100 parts by weight of a prepolymer of a 6000 molecular weight polyoxypropylene adduct of trimethylolpropane and mixed isomers of tolylene diisocyanate (80/20:2,4/2,6) having an NCO/OH mole ratio of 2:1, 10 parts by weight of toluene, 3 parts by weight of sodium lauryl sulfate and 70 parts by weight of water.

A separate chain extender solution is then prepared by dissolving 2-methylpiperazine in water in amount sufficient to produce an aqueous solution containing 15% by weight of 2-methylpiperazine. This mixture is agitated for 10 minutes with a conventional propeller type agitator, and then added over a period of several minutes to the above prepolymer dispersion with agitation by a conventional propeller mixer during the addition. The chain extender solution is added in an amount to produce a polyurethane having an $NH_2$/NCO ratio of 0.95/1.

A 3" x 6" x 0.03" carbon steel panel and a copper electrode are suspended in 900 milliliters of the above polyurethane dispersion contained in a 1-liter beaker. A 10-volt DC supply is connected to the copper electrode and the steel panel in series for 30 seconds with the steel panel as the anode and the copper electrode as the cathode with a current flow ranging from 200 to 210 milliamps. As the current flows through the emulsion, the dispersed particles of polyurethane plate out and discharge on the steel panel. The coated area on the panel is about 3½" x 3" and a coating thickness of 8 to 10 mils is obtained.

The identical procedure as set forth above is followed substituting a 5" x 3" x 0.025" aluminum panel for the steel panel. The current in this latter case is 190 to 200 milliamps and the thickness obtained is 8 to 10 mils.

EXAMPLE II

A prepolymer dispersion is prepared by vigorously agitating a mixture of 100 parts by weight of a prepolymer of a 1:2 mole ratio mixture of a 6000 molecular weight polyoxypropylene adduct of trimethylolpropane and a 650 molecular weight bisphenol base diol and mixed isomers of tolylene diisocyanate (80/20:2,4/2,6) having an NCO/OH mole ratio of 2:1, 40 parts by weight of toluene, 4 parts by weight of sodium salt of alkyl aryl polyether sulfate and 70 parts by weight of water.

A separate chain extender solution is then prepared by dissolving 2-methylpiperazine and morpholine in water in amount sufficient to produce an aqueous solution containing 15% by weight of 2-methylpiperazine plus morpholine, the proportion of 2-methylpiperazine to morpholine being 10 to 1 by weight. This mixture is agitated for 10 minutes with a conventional propeller type agitator and then added over a period of several minutes to the above prepolymer dispersion with agitation by a conventional propeller mixer during the agitation. The chain extender solution is added in an amount to produce a polyurethane having an $NH_2$/NCO ratio of 0.95/1.

A 3" x 6" x 0.03" carbon steel panel and a copper electrode are suspended in 900 milliliters of the above polyurethane dispersion contained in a 1-liter beaker. A 10-volt DC supply is connected to the copper electrode and the steel panel in series for 30 seconds with the steel panel as the anode and the copper electrode as the cathode with a current flow of 300 milliamps. As the current flows through the emulsion, the dispersed particles of the polyurethane plate out and discharge on the steel panel. The coated area on the steel panel is about 4½" x 3" and a coating thickness of about 2.5 mils on the face of the panel is obtained.

The identical procedure as set forth above is followed substituting a 5" x 3" x 0.025" aluminum panel for the steel panel. The thickness of the coating on the face of the aluminum panel is about 1 mil. A similar run is carried out with another steel panel of the same size as above with the exception that the voltage is applied for one minute instead of one-half minute. The thickness of the polyurethane coating on the face is about 7 mils. Another run is made with a steel panel of the same size as above wherein 50 volts are employed rather than 10 for a period of one minute. A coating of 3 mils on the face is obtained. An additional run is made with a similar steel panel wherein the voltage applied starts at 10 volts and is increased stepwise to 35 volts with a total time of one minute. A coating of 15 mils on the face is obtained.

EXAMPLE III

A prepolymer dispersion is prepared by vigorously agitating a mixture of 100 parts by weight of a prepolymer of a 675 molecular weight polyoxypropylene glycol and mixed isomers of tolylene diisocyanate (80/20:2,4/2,6) having an NCO/OH mole ratio of 1.5:1, 40 parts by weight toluene, 3 parts by weight surface active agent, and 70 parts by weight of water. The surface active agent consists of dihydric polyoxyethylene-polyoxypropylenes having a molecular weight of about 16,000, a molecular weight of the polyoxypropylene base of about 3250 and a polyoxyethylene content of about 80% by weight.

A separate chain extender solution is then prepared by dissolving 2-methylpiperazine in water in amount sufficient to produce an aqueous solution containing 15% by weight of 2-methylpiperazine. This mixture is agitated for 10 minutes with a conventional propeller type agitator and then added over a period of several minutes to the above prepolymer dispersion with agitation by a conventional propeller mixer during the addition. The chain extender solution is added in an amount to produce a polyurethane having an $NH_2/NCO$ ratio of 0.95/1.

A 3″ x 6″ x 0.03″ carbon steel panel and a copper electrode are suspended in 900 milliliters of the above polyurethane dispersion contained in a 1-liter beaker. A 10-volt DC supply is connected to the copper electrode and the steel panel in series for 30 seconds with the steel panel as the anode and the copper electrode as the cathode with a current flow of 20 milliamps. As the current flows through the emulsion, the dispersed particles of polyurethane plate out and discharge on the steel panel. The coated area on the panel is about 4½″ x 6″ and a thin, continuous coating having a thickness of less than 0.3 mil on the face is obtained.

The identical procedure as set forth above is followed with another 3″ x 6″ x 0.03″ steel panel with the exception that the initial voltage is 10 volts and is increased stepwise to 50 volts over a period of one minute, the initial amperage being 20 milliamps and the current increasing to 100 milliamps to correspond with 50 volts. A continuous coating having a thickness of 0.6 mil on the face is produced. A 3″ x 5″ x 0.025″ aluminum panel is also coated on an area 4½″ x 3″ at 10 volts and 20 milliamps current. A 0.5 mil thick coating is obtained.

EXAMPLE IV

The procedure of Example III is followed with the exception that the polyurethane dispersion employed is prepared by vigorously agitating a mixture of 72 parts by weight of a 675 molecular weight polyoxypropylene glycol, 28 parts by weight of mixed isomers of tolylene diisocyanate (80/20:2,4/2,6), 40 parts by weight of toluene, 3 parts by weight of sodium lauryl sulfate, 115 parts by weight water and an amount of 4,4′-methylene-bis-(2-chloroaniline) sufficient to produce a polyurethane dispersion having an $NH_2/NCO$ ratio of 0.95/1 and 0.05 part by weight stannous octoate. The electrodeposition procedure, as described in Example III, is carried out with a 3″ x 6″ x 0.03″ carbon steel panel as the anode, all as described in Example III. A thin, continuous polyurethane coating is produced.

While there has been shown and described hereinabove the preferred embodiments of this invention, it is to be understood that various changes, alterations and modifications can be made thereto without departing from the spirit and scope thereof as defined in the appended claims.

What is claimed is:

1. A method of coating metals with a polyurethane coating comprising the steps of immersing a metal to be coated as an anode of an electrical circuit in an aqueous polyurethane dispersion which dispersion is the reaction product of (I) an isocyanate-terminated polyurethane polymer formed from (a) active hydrogen containing organic compounds and mixtures thereof and (b) an organic polyisocyanate, the ratio of said polyisocyanate (b) to said active hydrogen containing compound (a) being such that the NCO/OH ratio is greater than about 1.3:1 and (II) a chain extender containing active hydrogen, the amount of said chain extender being sufficient to provide an active hydrogen/NCO ratio of from about 0.75:1 to 1.9:1 and passing an electric current between said anode and a cathode which is also immersed in said dispersion, said electric current being produced by impressing a potential of from about 5 to 250 volts across said anode and cathode.

2. A method of coating metals with a polyurethane coating comprising the steps of immersing a metal to be coated as an anode of an electrical circuit in an aqueous polyurethane dispersion which dispersion is prepared by simultaneously dispersing in water with vigorous agitation (1) an active hydrogen containing organic compound; (2) an organic isocyanate; (3) a chain extender; and (4) a metallo-organic salt catalyst and passing an electric current between said anode and a cathode which is also immersed in said dispersion, said electric current being produced by impressing a potential of from about 5 to 250 volts across said anode and cathode.

3. The method of claim 1 wherein said aqueous polyurethane dispersion is prepared by dispersing polymer (I) in water with vigorous agitation followed by the addition of chain extender (II) with rapid agitation.

4. The method of claim 3 wherein the weight ratio of polymer (I) to water is from about 1:4 to 2:1.

5. The method of claim 2 wherein said chain extender is a chemically hindered, aromatic diamine, said diamine is employed in an amount to provide an $NH_2/OH$ ratio from about 0.5:1 to 6:1, said isocyanate is employed in an amount to provide an $NCO/(OH+NH_2)$ ratio from about 0.9:1 to 1.5:1, and said catalyst is employed in an amount corresponding to about 0.01 to 1.0% of the combined weight of compound (1) and diamine (3).

6. The method of claim 5 wherein the weight ratio of the total weight of compounds (1), (2), (3) and (4) to water is from about 1:6 to 2:1.

References Cited

UNITED STATES PATENTS 3,230,162 1/1966 Gilchrist _____ 204—181
3,293,201 12/1966 Shahade et al. _____ 260—23

JOHN H. MACK, Primary Examiner

R. L. ANDREWS, Assistant Examiner